UNITED STATES PATENT OFFICE.

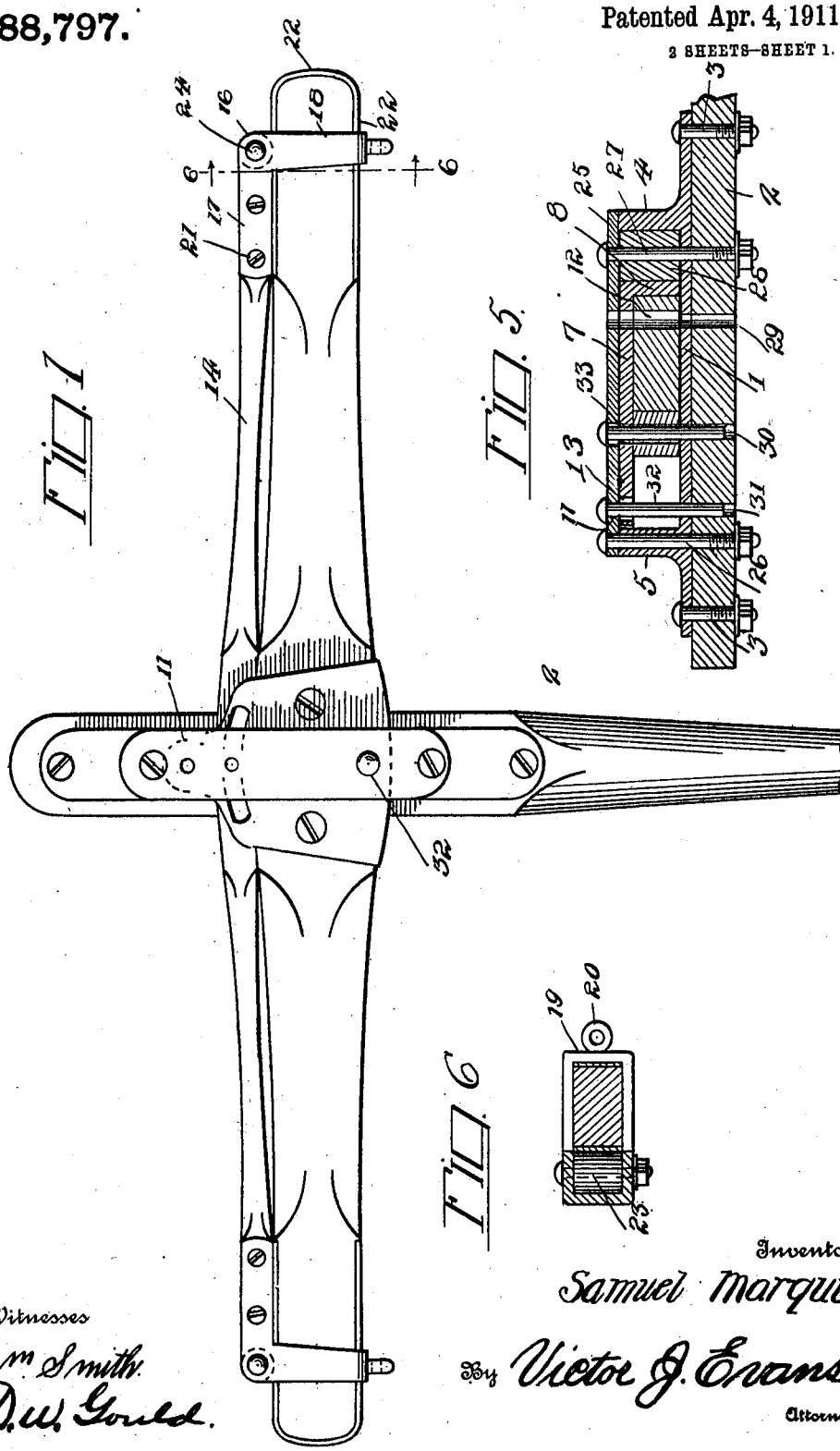

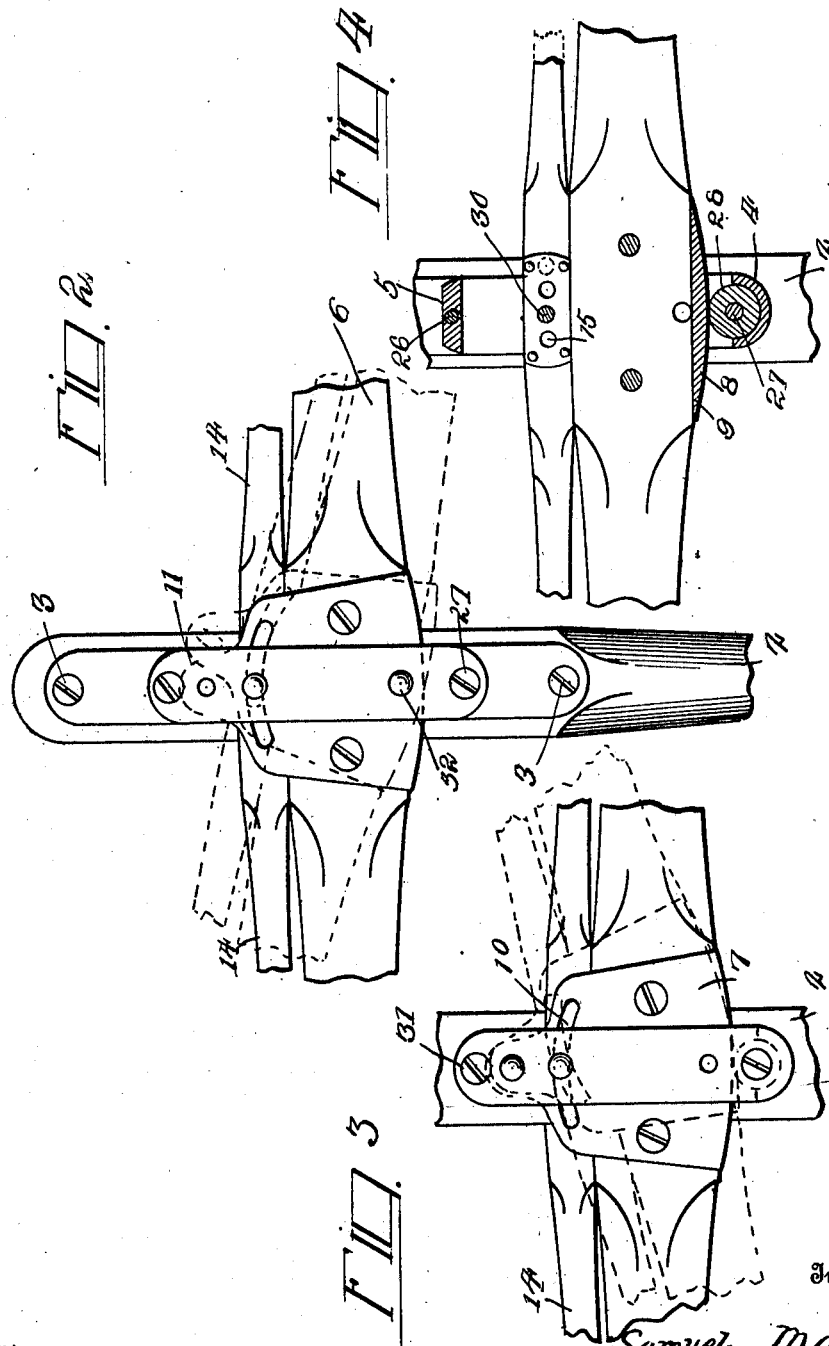

SAMUEL MARQUIS, OF MIDDLEBURG, OHIO.

EVENER.

988,797.

Specification of Letters Patent. Patented Apr. 4, 1911.

Application filed February 25, 1910. Serial No. 546,001.

*To all whom it may concern:*

Be it known that I, SAMUEL MARQUIS, a citizen of the United States, residing at Middleburg, in the county of Logan and State of Ohio, have invented new and useful Improvements in Eveners, of which the following is a specification.

The invention relates to an improved evener designed to provide for evening the draft of the respective animals of a team by so adjusting the draft connections as to increase the leverage in favor of the animal exerting the inferior pull.

The main object of the present invention is the provision of an evener bar to which draft attaching elements are directly connected, said elements being designed for automatic movement longitudinally of the doubletree so as to increase or decrease the distance of the particular element from the fulcrum point of the doubletree.

A further object of the invention is the provision of means whereby the evener can be moved longitudinally of the doubletree so as to permanently dispose said draft attaching elements at relatively different distances from the fulcrum point of the doubletree, thereby providing a leverage permanently favoring one or the other of the animals.

The invention in its preferred details of construction will be described in the following specification, reference being had particularly to the accompanying drawings, in which:—

Figure 1 is a plan of the improved evener. Fig. 2 is a similar view, partly broken off, one position of the parts being shown in dotted outline. Fig. 3 is a view similar to Fig. 2, the fulcrum point of the doubletree being reversed. Fig. 4 is a plan of the parts with the top of the fulcrum plate removed. Fig. 5 is a longitudinal central section, partly in elevation of the device, with the parts arranged as shown in Fig. 3. Fig. 6 is a section on line 6—6 of Fig. 1.

Referring particularly to the accompanying drawings, the improved evening device includes a bearing plate 1 designed to be removably secured on the upper surface of a tongue or draft beam 2 near the rear or working connected end of the latter. The bearing plate is secured in place by bolts 3 passing through the tongue and is formed at some distance from each end with uprights 4 and 5, the former being toward the forward end of the plate and being of semi-cylindrical shape, as more clearly shown in Fig. 4. The upright 5 is preferably in post form having a width equal to the similar dimension of the base plate.

A doubletree 6 is arranged to coöperate with the base plate, comprising a suitable length of appropriate material which is centrally provided with what I term a fulcrum plate 7. This plate is secured upon the upper surface of the doubletree and is provided at its forward edge with a depending section 8 designed to bear against the forward edge of the doubletree, the forward edge of the section 8 being rounded as shown at 9 in Fig. 4. The fulcrum plate projects in rear of the rear edge of the doubletree and immediately adjacent though beyond said rear edge is formed with a transversely disposed arcuate slot 10. Rearwardly beyond the slot the plate is centrally formed with an ear-like extension 11. The forward portion of the fulcrum plate is formed with a pivot opening 12 and the ear 11 is formed with a similar opening 13, said openings 12 and 13 being on the longitudinal median line of the fulcrum plate and being slightly elongated as shown.

Arranged in rear of the doubletree is an evener bar 14 which at a point central of its length is formed with a series of longitudinally disposed openings 15. Each end of the evener bar, which bar is of less length than that of the doubletree, is provided with what I term a draft attaching element comprising a connector 16 made up of superimposed right angle plates 17 and 18, the latter being connected at their forward or free ends by an upright section 19 centrally formed with an eye 20 to receive the singletree connection. The plates 17 of the member are so spaced as to embrace the end of the evener bar between them, bolts 21 securing the member to the evener bar so that the plates 18 project at approximately right angles therefrom. The plates 18 are so spaced and are of such length as to provide for sliding freely on the end of the doubletree, the edge of said doubletree being preferably reinforced against wear by a metallic strip 22 and a roller 23 being mounted on a pivot pin 24 arranged at the angle of the plates, said roller bearing upon the wear strip 22 in the operation of the device.

It is understood that the parts are so arranged that when the doubletree with the fulcrum plate and evener bar are placed on the base plate 1 between the uprights 4 and 5, the upper surface of the fulcrum plate will be just below the upper edge of the uprights while the evener bar will underlie the rearwardly projecting portion of the fulcrum plate with the openings 15 in said bar vertically alined with the slot 10 in the fulcrum plate. In this position a cap 25 is secured in place, being connected to the rear upright 5 by a bolt 26 and to the base plate immediately adjacent the upright 4 by a bolt 27. The bolt 27 forms an axis for the roller 28 partly housed within the upright 4 and designed to provide a bearing for the rounded edge 9 of the fulcrum plate.

It is of course to be understood that the doubletree 6, the base plate 1 and the tongue 2 are formed with openings 29 to aline with the opening 12, said tongue and base plate being formed with openings 30 to aline with any one of the openings 15 in the evener bar, and also formed with an opening 31 to aline with the opening 13 in the ear 11.

In the ordinary use of the evener, wherein it is designed to automatically compensate for an uneven draft, a pivot pin 32 is passed down through the opening 12 in the fulcrum plate and through the openings 29 in the cap, base plate, tongue and doubletree. A second pivot pin 33 is passed through the opening in the cap, the slot 10 in the fulcrum plate, the central opening 15 in the evener bar and the openings 30 in the base plate and tongue. As the animal having the pull in his favor will draw the end of the doubletree to which he is connected forward the opposing end will of course be moved backward. This movement will draw the draft attaching member to which the animal of superior pull is attached toward the tongue and force the opposing element from the tongue. This will increase the leverage in favor of the animal of inferior pull, and thereby compensate for the difference. In this operation it is to be particularly noted that the pivot pins 32 and 33 do not form bearing centers for the strain, as the openings through which they pass are elongated so that the fulcrum of pull or leverage is at all times and under all conditions the roller 28. If it is desired to give one or the other of the animals a permanent advantage, as in the case of a known difference of strengths, the evener bar may be shifted to move one or the other of the draft attaching members in a position of superior leverage and secured in such position by passing the pivot pin 33 through one of the holes 15 on either side of the central hole.

The effect just described can be gained with a less degree of compensation by arranging the pivot pin 32 in rear of the pivot pin 33, that is passing it through the openings 31 in the cap, 13 in the ear 11, and 31 in the base plate and tongue. Under these conditions the pivot point of the fulcrum plate is changed, but the bearing point of the strain supporting point is still the roller 28.

The improved evener is a simple construction, will readily and automatically compensate for any excess of pull in favor of one or the other of the animals, or the device may be adjusted so as to give one or the other of the animals a permanent advantage in leverage.

Having thus described the invention, what is claimed as new, is:—

1. The combination with a draft bar, of a base plate secured thereto, a fulcrum support mounted on the base plate, a doubletree, a fulcrum plate secured to the doubletree and formed with a curved edge to engage the fulcrum support, means for pivotally connecting the fulcrum plate to the base plate, said plate extending in rear of the doubletree and being formed with an arcuate slot, an evener bar, draft connectors carried by said bar and slidably engaging the doubletree, and a pivot pin passing through the slot and fulcrum plate and pivotally connecting the evener bar and base plate.

2. The combination of a draft bar, of a base plate secured thereto, of spaced uprights integral with said base plate, a fulcrum support mounted on said base plate, a doubletree, a fulcrum plate secured to the doubletree and formed with a curved edge to engage the fulcrum support, means for pivotally connecting the fulcrum plate to the base plate, a depending flange adapted to engage the forward edge of said doubletree and formed integral with said plate, said plate extending in rear of the doubletree and being formed with an arcuate slot, an evener bar, draft connections carried by said bar and slidably engaging the doubletree, and a pivot pin passing through the slot and fulcrum plate and pivotally connecting the evener bar and base plate.

In testimony whereof I affix my signature in presence of two witnesses.

SAMUEL MARQUIS.

Witnesses:
RAY B. ARTHUR,
M. R. LINDSEY.

---

Copies of this patent may be obtained for five cents each, by addressing the "Commissioner of Patents, Washington, D. C."